(12) United States Patent
Ameen et al.

(10) Patent No.: US 12,045,291 B2
(45) Date of Patent: Jul. 23, 2024

(54) ENTITY EXPLANATION IN DATA MANAGEMENT

(71) Applicant: INTERNATIONAL BUSINESS MACHINES CORPORATION, Armonk, NY (US)

(72) Inventors: Muhammed Abdul Majeed Ameen, Kozhikode (IN); Balaji Ganesan, Bengaluru (IN); Avirup Saha, Kolkata (IN); Abhishek Seth, Deoband (IN); Devbrat Sharma, Bangalore (IN); Arvind Agarwal, New Delhi (IN); Soma Shekar Naganna, Bangalore (IN); Sameep Mehta, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/980,477

(22) Filed: Nov. 3, 2022

(65) Prior Publication Data
US 2024/0152557 A1   May 9, 2024

(51) Int. Cl.
*G06F 16/906* (2019.01)
*G06N 7/01* (2023.01)

(52) U.S. Cl.
CPC .............. *G06F 16/906* (2019.01); *G06N 7/01* (2023.01)

(58) Field of Classification Search
CPC ...... G06F 16/906; G06F 18/22; G06F 11/079; G06F 11/323; G06F 21/552;
(Continued)

(56) References Cited

U.S. PATENT DOCUMENTS

| 9,600,602 | B2  |   | 3/2017 | Natarajan et al. |
| 9,600,769 | B1  | * | 3/2017 | Liu .......................... H04L 51/02 |

(Continued)

OTHER PUBLICATIONS

Dai et al., Artcile: "Towards Self-Explainable Graph Neural Network" CIKM '21: Proceedings of the 30th ACM International Conference on Information & Knowledge Management, Oct. 2021, pp. 302-311, available via: https://doi.org/10.1145/3459637.3482306 (Year: 2021).*

(Continued)

*Primary Examiner* — Evan Aspinwall
(74) *Attorney, Agent, or Firm* — CUENOT, FORSYTHE & KIM, LLC (57) ABSTRACT

Records can be matched by a graph neural network model performing entity resolution on the records, and representing each record as a respective node in a graph. Record matching explanations can be generated, each record matching explanation indicating a first set of attributes, and a first set of corresponding values, used for the matching at least two of the records. Nodes can be clustered into a plurality of clusters by aggregating the record matching explanations and, based on the record matching explanations, determining which of the records have high importance values, in the first set of values, that match. At least one cluster explanation can be generated, the cluster explanation indicating a second set of attributes, and a second set of values corresponding to the second set of attributes, used for the clustering the nodes. The record matching explanation and the cluster explanation can be output.

17 Claims, 8 Drawing Sheets

(58) Field of Classification Search
CPC ......... G06F 18/213; G06F 18/10; G06N 7/01;
G06N 5/045; G06N 5/022; G06N 3/08;
G06N 20/00; G06N 5/025; G06N 3/042;
G06N 3/047; G06N 5/048; G06N 5/04;
G06N 3/0455; G06N 3/092
USPC ............................................ 707/737; 706/15
See application file for complete search history.

(56) References Cited

U.S. PATENT DOCUMENTS

| | | | |
|---|---|---|---|
| 2015/0269494 A1 | 9/2015 | Kardes et al. | |
| 2019/0259033 A1* | 8/2019 | Reddy | G06N 5/02 |
| 2021/0174253 A1* | 6/2021 | Moore | G06N 7/01 |
| 2021/0319280 A1* | 10/2021 | Xu | G06N 3/08 |
| 2022/0012219 A1 | 1/2022 | Pulipaty et al. | |
| 2022/0114417 A1* | 4/2022 | Dalli | G06N 3/042 |
| 2022/0172050 A1* | 6/2022 | Dalli | G06N 3/08 |
| 2022/0207240 A1* | 6/2022 | Björkqvist | G06F 3/0484 |
| 2023/0022673 A1* | 1/2023 | Derzsy | G06N 5/022 |

OTHER PUBLICATIONS

Wang, Q. et al., "A clustering-based framework for incrementally repairing entity resolution," In Pacific-Asia Conference on Knowledge Discovery and Data Mining, Apr. 19, 2016, pp. 283-295. Springer, Cham.

Ganesan, B. et al., "Anu question answering system," In ISWC (Demos/Industry), Jan. 1, 2020, 2 pg.

Barton, R.A. et al., "Graph Neural Networks for Inconsistent Cluster Detection in Incremental Entity Resolution," arXiv preprint arXiv:2105.05957, May 12, 2021, 13 pg.

Saha, A. et al., "Short Text Clustering in Continuous Time Using Stacked Dirichlet-Hawkes Process with Inverse Cluster Frequency Prior," In ACM SIGKDD International Conference on Knowledge Discovery and Data Mining, Aug. 14, 2021, 5 pg.

Ebaid, A. et al., "Explainer: entity resolution explanations," In 2019 IEEE 35th International Conference on Data Engineering (ICDE), Apr. 8, 2019, pp. 2000-2003. IEEE.

Gad-Elrab, M.H. et al., "Excut: Explainable embedding-based clustering over knowledge graphs." In International Semantic Web Conference, pp. 218-237. Springer, Cham, 2020.

Ganesan, B. et al., "Link prediction using graph neural networks for master data management," arXiv preprint arXiv:2003.04732, Mar. 7, 2020, 10 pg.

Singh, A. et al., "Reimagining GNN Explanations with ideas from Tabular Data," arXiv preprint arXiv:2106.12665, Jun. 23, 2021, 4 pg.

Vanya, B.K. et al., "Towards Automated Evaluation of Explanations in Graph Neural Networks," 2021, 5 pg.

Dai, E. et al., "Towards self-explainable graph neural network," In Proceedings of the 30th ACM International Conference on Information & Knowledge Management, Oct. 26, 2021, pp. 302-311.

Sambaturu et al., "Efficient algorithms for generating provably near-optimal cluster descriptors for explainability." In Proceedings of the AAAI Conference on Artificial Intelligence, vol. 34, No. 02, pp. 1636-1643. 2020.

Dhani, J.S. et al., "Similar cases recommendation using legal knowledge graphs," arXiv preprint arXiv:2107.04771, Jul. 10, 2021, 4 pg.

Xiang, H. et al., "Isolation forest based anomaly detection framework on non-IID data," IEEE Intelligent Systems 36, No. 3, Feb. 12, 2021, pp. 31-40.

Mell, P. et al., The NIST Definition of Cloud Computing, National Institute of Standards and Technology, U.S. Dept. of Commerce, Special Publication 800-145, Sep. 2011, 7 pg.

* cited by examiner

┌─────────────────────────────────────────────────────────────────────────┐
│ Train a graph neural network model to perform entity resolution          │
│ 302                                                                       │
└─────────────────────────────────────────────────────────────────────────┘
                                    ↓
┌─────────────────────────────────────────────────────────────────────────┐
│ Match a plurality of records by the graph neural network model performing entity resolution on │
│ the plurality of records, and represent the records as nodes of a graph │
│ 304                                                                       │
└─────────────────────────────────────────────────────────────────────────┘
                                    ↓
┌─────────────────────────────────────────────────────────────────────────┐
│ Generate a plurality of record matching explanations, each record matching explanation │
│ indicating a first set of attributes, and a first set of values corresponding to the first set of │
│ attributes, used for the matching at least two of the plurality of records │
│ 306                                                                       │
└─────────────────────────────────────────────────────────────────────────┘
                                    ↓
┌─────────────────────────────────────────────────────────────────────────┐
│ Cluster the nodes into a plurality of clusters by aggregating the plurality of record matching │
│ explanations and, based on the plurality of record matching explanations, determining which of │
│ the plurality of records have high importance values, in the first set of values, that match │
│ 308                                                                       │
└─────────────────────────────────────────────────────────────────────────┘
                                    ↓
┌─────────────────────────────────────────────────────────────────────────┐
│ Generate, for each cluster, a respective cluster explanation, the cluster explanation indicating a │
│ second set of attributes, and a second set of values corresponding to the second set of attributes, │
│ used for the clustering the nodes                                         │
│ 310                                                                       │
└─────────────────────────────────────────────────────────────────────────┘
                                    ↓
┌─────────────────────────────────────────────────────────────────────────┐
│ Assign a respective score to each node of the graph based on analyzing the record represented │
│ by the node                                                               │
│ 312                                                                       │
└─────────────────────────────────────────────────────────────────────────┘
                                    ↓
┌─────────────────────────────────────────────────────────────────────────┐
│ Determine a representative record for the entity based on the scores assigned to the nodes │
│ 314                                                                       │
└─────────────────────────────────────────────────────────────────────────┘
                                    ↓

```
Generate an inter-cluster edge explanation, the inter-cluster edge explanation indicating at least
one dissimilarity between at least two nodes
316
```

```
Identify anomalous nodes and/or clusters
318
```

```
Output the graph, record matching explanations, cluster explanations, node details,
representative records, inter-cluster edge explanations, node comparisons, and data indicating
the anomalous nodes and/or clusters
320
```

```
Receive a user input indicating at least one anomalous node and/or anomalous cluster to unlink
from the graph
322
```

```
Determining an impact on the graph of unlinking the indicated anomalous nodes and/or
anomalous clusters from the graph by analyzing the graph without the indicated anomalous
nodes and/or anomalous clusters
324
```

```
Outputting the determined impact on the graph of unlinking the indicated anomalous nodes and/
or anomalous clusters from the graph
326
```

RECORD MATCHING EXPLANATION 600

| Attribute | Value |
|---|---|
| #business_address.address_line1 | 836 Forest RD (0.522) |
| business_address.city | Britney (0.696) |
| business_address.province_state | ME (0.6) |
| business_address.postal_code | 4539.0 (0.623) |
| business_name.name | Ricky's Supermarket (0.597) |
| business_telephone.phone_number | 888-999-5555 (0.699) |
| collection_id | 47ab397c-a233-4315-9b09-9e83bb22cd96 (0.469) |
| duns.identification_number | 9999888877 (0.53) |
| entity_id | organization_entity-33322221 (0.455) |
| record_last_updated | Fri Aug 21 2022 10:34:01 GMT+0000 (UTC) (0.561) |
| record_source | orgRecord (0.496) |

↑ 602    FIG. 6    ↑ 604

CLUSTER EXPLANATION 700

| Grouped By | Value |
|---|---|
| business_address.city | Britney (0.696) |
| business_address.province_state | ME (0.6) |
| business_address.postal_code | 4539.0 (0.623) |
| business_telephone.phone_number | 888-999-5555 (0.699) |

NODE DETAILS 800

| Attributes | 123588944 |
|---|---|
| address_line1 | 836 Forest RD |
| city | Britney |
| cluster_id | 1 |
| collection_id | 47ab397c-a233-4315-9b09-9e83bb22cd96 |
| entity_id | organization_entity-33322221 |
| identification_number | 9999888877 |
| name | Ricky's Supermarket |
| node_id | 4 |

INTER-CLUSTER EDGE EXPLANATION (DISSIMILARITY) 900

| Attribute | Value |
|---|---|
| #business_address.address_line1 | (, 836 Forest RD) |
| business_address.city | (nan, Britney) |
| business_address.province_state | (nan, ME) |
| business_address.postal_code | (nan, 4539.0) |

NODE COMPARISON 1000

| Ricky's Supermarket 4800600 | Ricky's Supermarket 8982528 |
|---|---|
| nan | 836 Forest RD) |
| nan | Britney |
| nan | ME |
| nan | 4539.0 |
| Ricky's Supermarket | Ricky's Supermarket |

. . .

| orgRecord1 | orgRecord2 |
|---|---|

ENTITY EXPLANATION IN DATA MANAGEMENT

BACKGROUND

The present invention relates to data processing systems, and more specifically, to data management.

Data processing systems, such as enterprise data processing systems, sometimes are tasked with processing data accumulated by disparate data sources. For example, data stored in a variety of different databases may be processed. Sometimes different data sources contain data pertaining to the same entities. Entity resolution often is used to identify, for particular entities, the data from the various data sources that pertains to those entities.

SUMMARY

A method includes matching a plurality of records by a graph neural network model performing entity resolution on the plurality of records, and representing each of the plurality of records as a respective node in a graph. The method also can include generating a plurality of record matching explanations, each record matching explanation indicating a first set of attributes, and a first set of values corresponding to the first set of attributes, used for the matching at least two of the plurality of records. The method also can include clustering the nodes into a plurality of clusters by aggregating the plurality of record matching explanations and, based on the plurality of record matching explanations, determining which of the plurality of records have high importance values, in the first set of values, that match. The method also can include generating, using a processor, at least one cluster explanation, the cluster explanation indicating a second set of attributes, and a second set of values corresponding to the second set of attributes, used for the clustering the nodes. The method also can include outputting the record matching explanation and the cluster explanation.

A system includes a processor programmed to initiate executable operations. The executable operations include matching a plurality of records by a graph neural network model performing entity resolution on the plurality of records, and representing each of the plurality of records as a respective node in a graph. The executable operations also can include generating a plurality of record matching explanations, each record matching explanation indicating a first set of attributes, and a first set of values corresponding to the first set of attributes, used for the matching at least two of the plurality of records. The executable operations also can include clustering the nodes into a plurality of clusters by aggregating the plurality of record matching explanations and, based on the plurality of record matching explanations, determining which of the plurality of records have high importance values, in the first set of values, that match. The executable operations also can include generating at least one cluster explanation, the cluster explanation indicating a second set of attributes, and a second set of values corresponding to the second set of attributes, used for the clustering the nodes. The executable operations also can include outputting the record matching explanation and the cluster explanation.

A computer program product includes one or more computer readable storage mediums having program code stored thereon. The program code stored on the one or more computer readable storage mediums collectively executable by a data processing system to initiate operations. The operations include matching a plurality of records by a graph neural network model performing entity resolution on the plurality of records, and representing each of the plurality of records as a respective node in a graph. The operations also can include generating a plurality of record matching explanations, each record matching explanation indicating a first set of attributes, and a first set of values corresponding to the first set of attributes, used for the matching at least two of the plurality of records. The operations also can include clustering the nodes into a plurality of clusters by aggregating the plurality of record matching explanations and, based on the plurality of record matching explanations, determining which of the plurality of records have high importance values, in the first set of values, that match. The operations also can include generating at least one cluster explanation, the cluster explanation indicating a second set of attributes, and a second set of values corresponding to the second set of attributes, used for the clustering the nodes. The operations also can include outputting the record matching explanation and the cluster explanation.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

The present invention relates to data processing systems, and more specifically, to data management.

The arrangements described herein are directed to computer technology, and provide an improvement to computer technology. Specifically, the present arrangements improve the resolution of data provided by data processing systems, generating additional data that explains data matched using entity resolution.

For large entities, data records pertaining to those entities can number in the thousands, tens of thousands, hundreds of thousands, or even millions. It is not possible for a person, absent use of a computer, to perform entity resolution to accurately resolve all of those records. Thus, to obtain accurate entity resolution covering all of such records, such process must be implemented by a data processing system.

Even then, oftentimes it is difficult for a user to ascertain why certain data records are clustered and others are not.

The arrangements described herein address deficiencies of prior entity resolution processes. Specifically, the arrangements described herein can utilize a graph neural network (GNN) model to improve accuracy of entity record matching using a graph. The graph can include a plurality of nodes, with each node representing record. The GNN model can be used to cluster the nodes based on matching of record values rather than using prior art bucketing techniques. Bucketing is computer resource intensive when implemented on a large scale. The arrangements described herein are less resource intensive than bucketing, and thus improve the operational performance of computers performing entity resolution.

The present arrangements can identify common features of the nodes and use the common features to create clusters of nodes. A GNN model explainer can be used to find commonalities between all nodes in a cluster. A cluster identifier can be used as a node class for all nodes in the cluster. This avoids needing to provide k-number of clusters or needing to provide node class labels. Further, a multi-layer perceptron can be used to remove edges and features not important for multi-node classification.

Moreover, the arrangements described herein can utilize GNN models to generate the various explanations of the entity record matching. The explanations can be output, for example to a computer display, thus explaining to users how the matched records are related.

Further, in one or more arrangements, anomalous nodes for records and/or clusters of such nodes can be identified. Data indicating the anomalous nodes and/or clusters can be output, for example to a computer display, thus indicating to users the anomalous nodes and/or clusters. A user input can be received indicating one or more anomalous nodes and/or clusters to unlink from the graph. The graph can be analyzed to determine an impact of unlinking the anomalous nodes and/or clusters, and corresponding data can be output.

Several definitions that apply throughout this document now will be presented.

As defined herein, the term "entity" means a business, organization or governmental entity.

As defined herein, the term "graph" means a functional data structure comprising a plurality of nodes, with each node representing a corresponding data record.

As defined herein, the term "node" means a representation of a record in a graph.

As defined herein, the term "record" means a record of data. A record can be, for example, a record in a database. In illustration, a record can be contained in a data table of a database. A data table can include a plurality of fields, typically as columns of the data table, and a plurality of records, typically as rows of the data table. Each record can include one of each of the plurality of fields.

As defined herein, the term "cluster," when used as a noun, means a grouping of two or more nodes in a graph.

As defined herein, the term "cluster," when used as a verb, means the process of grouping two or more nodes in a graph.

As defined herein, the term "explanation" means data explaining information relating to one or more records.

As defined herein, the term "output" means storing in memory elements, writing to display or other peripheral output device, sending or transmitting to another system, exporting, or similar operations.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "user" means a person (i.e., a human being).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
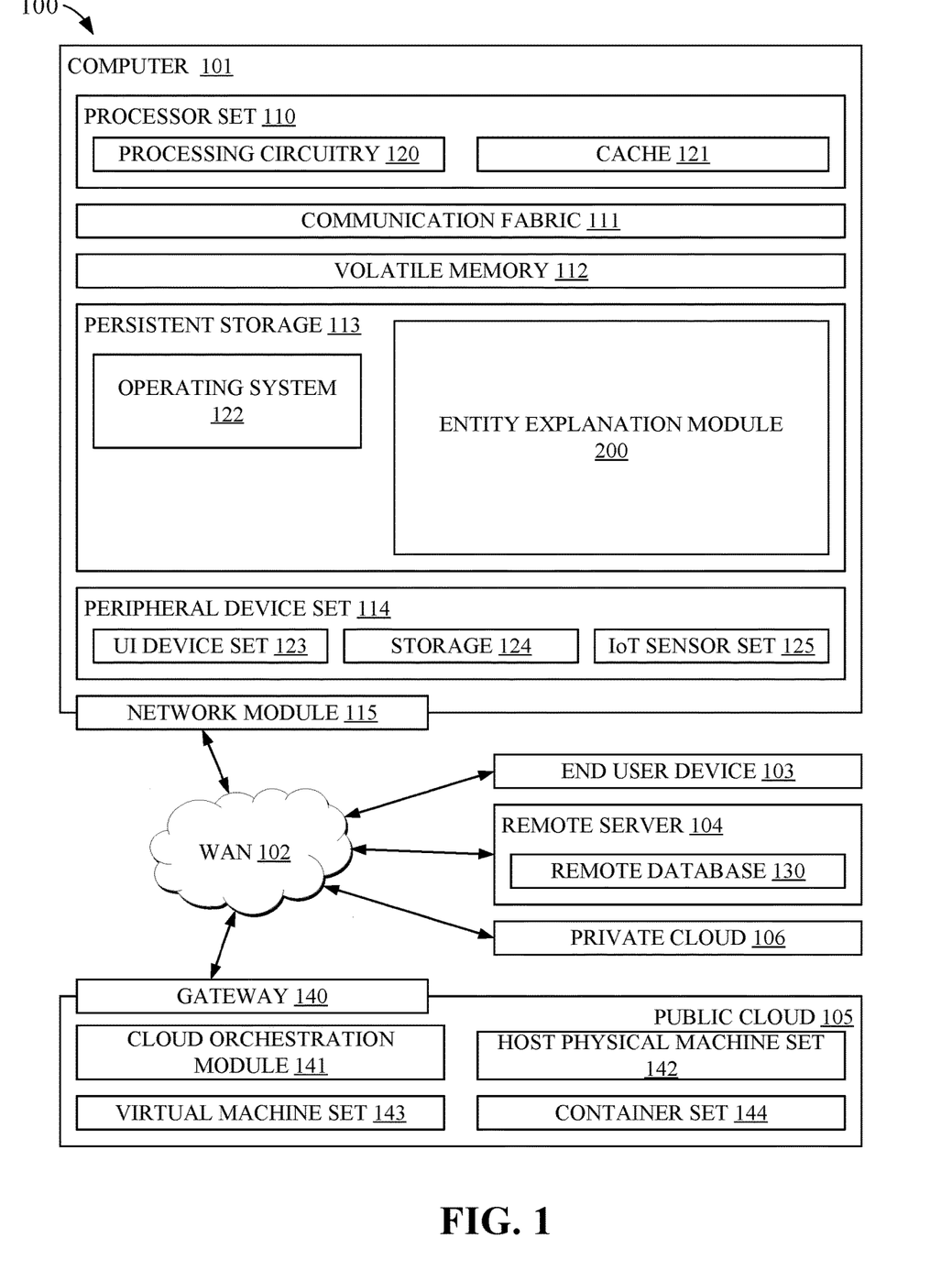
FIG. 1 depicts a computing environment according to an embodiment of the present invention.

Computing environment 100 contains an example of an environment for the execution of at least some of the computer code involved in performing the inventive methods, such as entity explanation module 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores miming on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
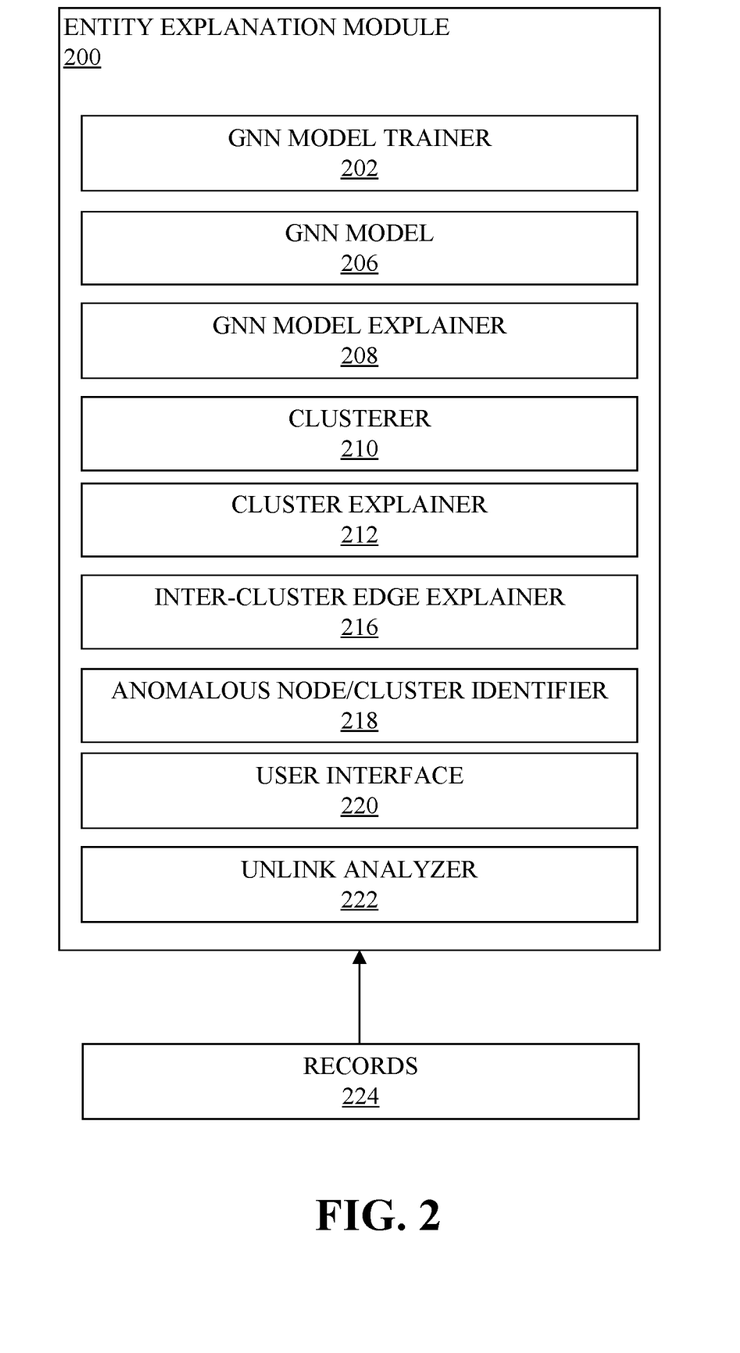
FIG. 2 depicts an entity explanation module according to an embodiment of the present invention.

FIG. 2 depicts an entity explanation module 200 according to an embodiment of the present invention. Entity explanation module 200 can include a graph neural network (GNN) model trainer 202, a GNN model 206, one or more GNN model explainers 208, a clusterer 210, a cluster explainer 212, an inter-cluster edge explainer 216, an anomalous node/cluster identifier 218, a user interface 220 and an unlink analyzer 222.

GNN MODEL TRAINER 202 is a module that trains a GNN model, such as GNN model 204, using artificial intelligence (AI) and machine learning techniques. GNN model trainer 202 can train GNN model 206 using probabilistic matching engine (PME) output data. PME receives records as input and outputs indications of entities (e.g., large entities). A plurality of records can correspond to an entity. PME also can determine similarity between any two records, which can be indicated by a PME score. PME can provide the ground truth to train GNN models for the same entity matching task.

GNN MODEL 206 receives a list of records as an input, and treats each record as a node of a graph. GNN model 206 outputs predictions for each pair of records for an entity (e.g., a large entity), or for a sample pair of records. GNN model 204 can use a multilayer perceptron (MLP) or other suitable differentiable model on each node of the graph, forming a GNN layer. For each node vector, the MLP can be applied to return a learned node-vector. GNN model 204 can apply a similar process to each edge of the graph, thus learning per-edge embedding. GNN model 204 also can apply a similar process for a global-context vector, thus learning a single embedding for the entire graph.

GNN MODEL EXPLAINER 208 generates explanations indicating features upon which records are matched. The explanations can be pair-wise explanations indicating record values that match among one or more pairs of records. GNN model explainer 208 can analyze two records that correspond to a same entity as inputs and output predictions for each pair of records. GNN model explainer 208 also can do the same for sample records. The features upon which the records are matched can be features deemed by GNN model explainer 208 to be important features, which GNN model explainer 208 can learn through training using AI and machine learning techniques. In this regard, GNN model explainer 208 can be based on a GNN explainability model.

CLUSTERER 210 groups nodes of the graph, and thus records represented by the nodes, into clusters based on features upon which the records are matched.

CLUSTER EXPLAINER 212 generates explanations indicating features common to records assigned to a same cluster. For example, cluster explainer 212 can indicate the features upon which clustering of the records is based. Cluster explainer 212 also can learn through training using AI and machine learning techniques. In this regard, cluster explainer 212 also can be based on a GNN explainability model.

INTER-CLUSTER EDGE EXPLAINER 216 generates explanations of similarity and/or dissimilarity between records represented by nodes connected by an edge. Such explanations can indicate dissimilarity of important features or important features only contained in one of two records being compared.

ANOMALOUS NODE/CLUSTER IDENTIFIER 218 identifies nodes and/or clusters that are anomalous (e.g., outlier nodes and/or clusters). Anomalous node/cluster identifier 218 can implement an Isolation Forest algorithm on a vector of a record's values, or a vector of a subset of the record's values, using a GNN model trained to identify nodes and/or clusters that are anomalous. The record values, or subset of record values, in the vector can be values of the fields corresponding to the fields used to cluster other records.

USER INTERFACE 220 can present various data to a user, for example via a display, and receive user inputs from the user, for example via a touch screen, keyboard, mouse, voice recognition, etc. Data presented to the user can include, but is not limited to, a visual presentation of the graph, matching explanations, cluster explanations, node details (e.g., record details), inter-cluster edge explanations, node comparisons, etc. Via user interface 220, the user can select one or more nodes to unlink from the graph for purposes of analyses. For example, the user can enter a user input indicating at least one anomalous node and/or anomalous cluster to unlink from the graph.

UNLINK ANALYZER 222 determines an impact on the graph of unlinking the indicated anomalous nodes and/or anomalous clusters from the graph by analyzing the graph without the indicated anomalous nodes and/or anomalous clusters. Via user interface 220, unlink analyzer 222 can output the determined impact on the graph from such unlinking. By way of example, unlink analyzer 222 can trigger cluster explainer 212, inter-cluster edge explainer 216 and anomalous node/cluster identifier 218 to update the respective data generated by those components of entity explanation module 200.

In operation, explanation module 200 can receive records 224, for example from a database (not shown) of computer 101 and/or from one or more remote databases 130. Explanation module 200 can process records 224 to generate a graph and a variety of additional information explaining the records, as will be described herein.

Figure 3A:
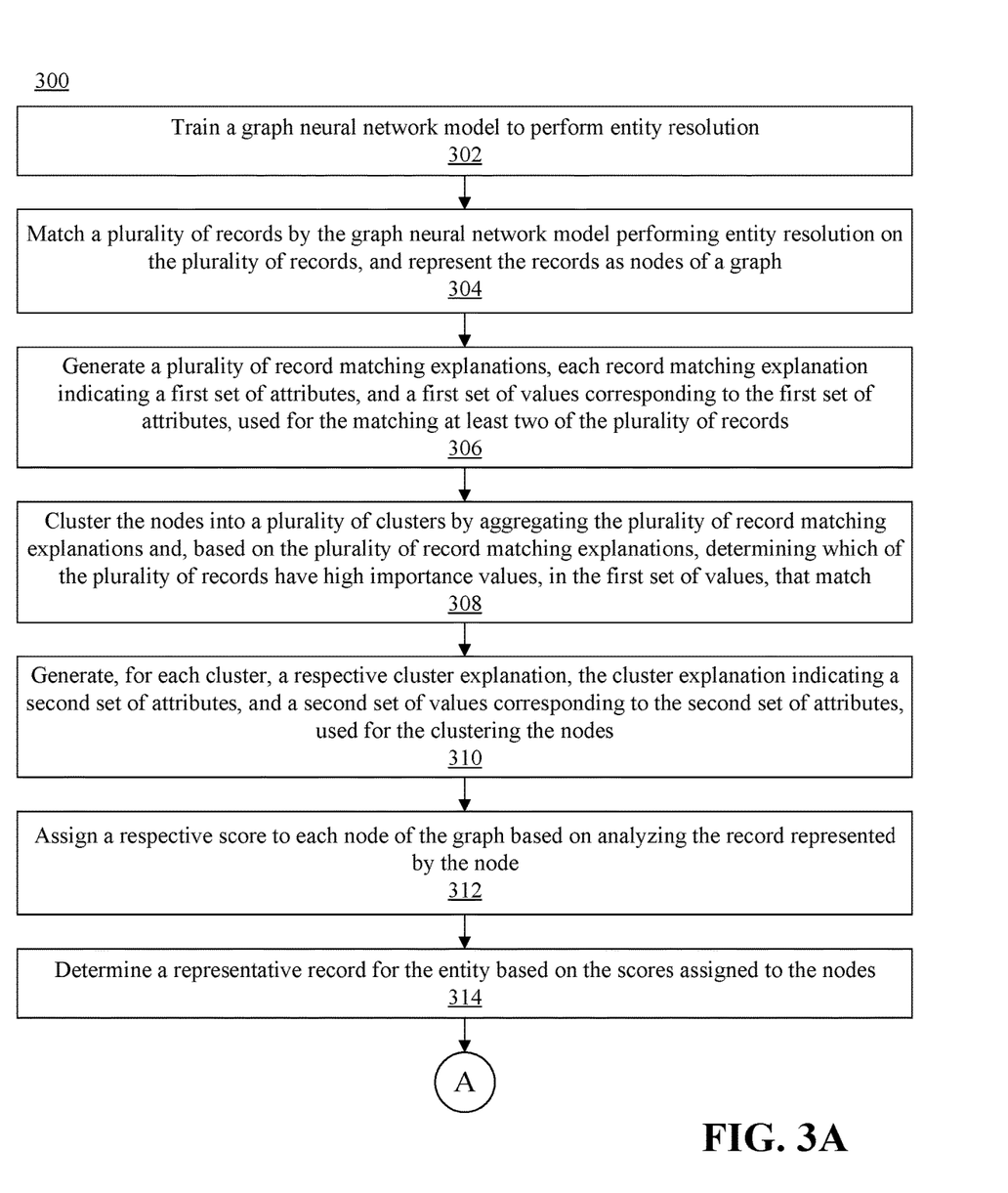
FIGS. 3A-3B depict a flowchart illustrating an example of a method of explaining records corresponding to an entity according to an embodiment of the present invention.
Figure 3B:
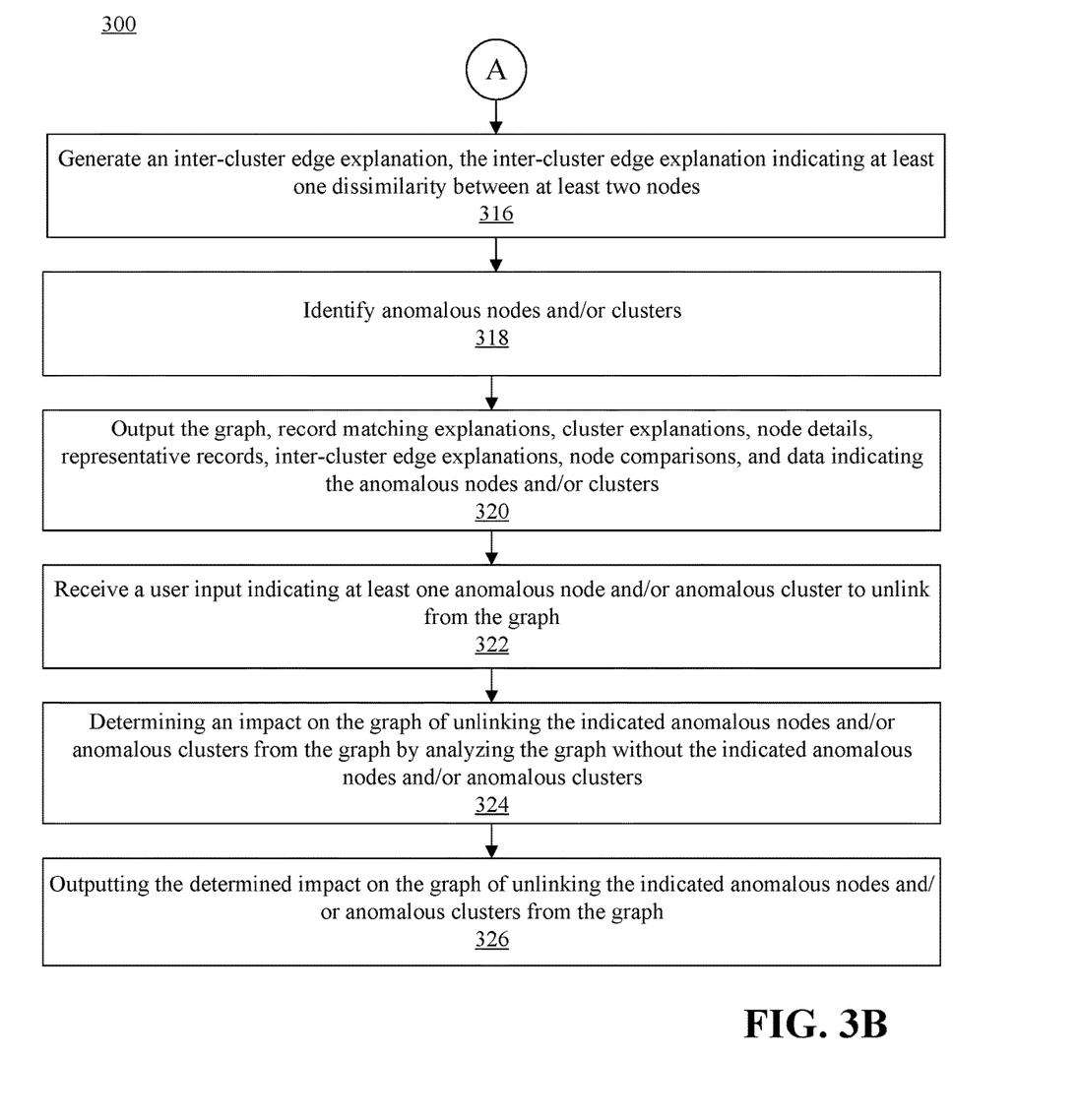

FIGS. 3A-3B depict a flowchart illustrating an example of a method 300 of explaining records corresponding to an entity according to an embodiment of the present invention. The method 300 can be implemented by entity explanation module 200.

Figure 4:
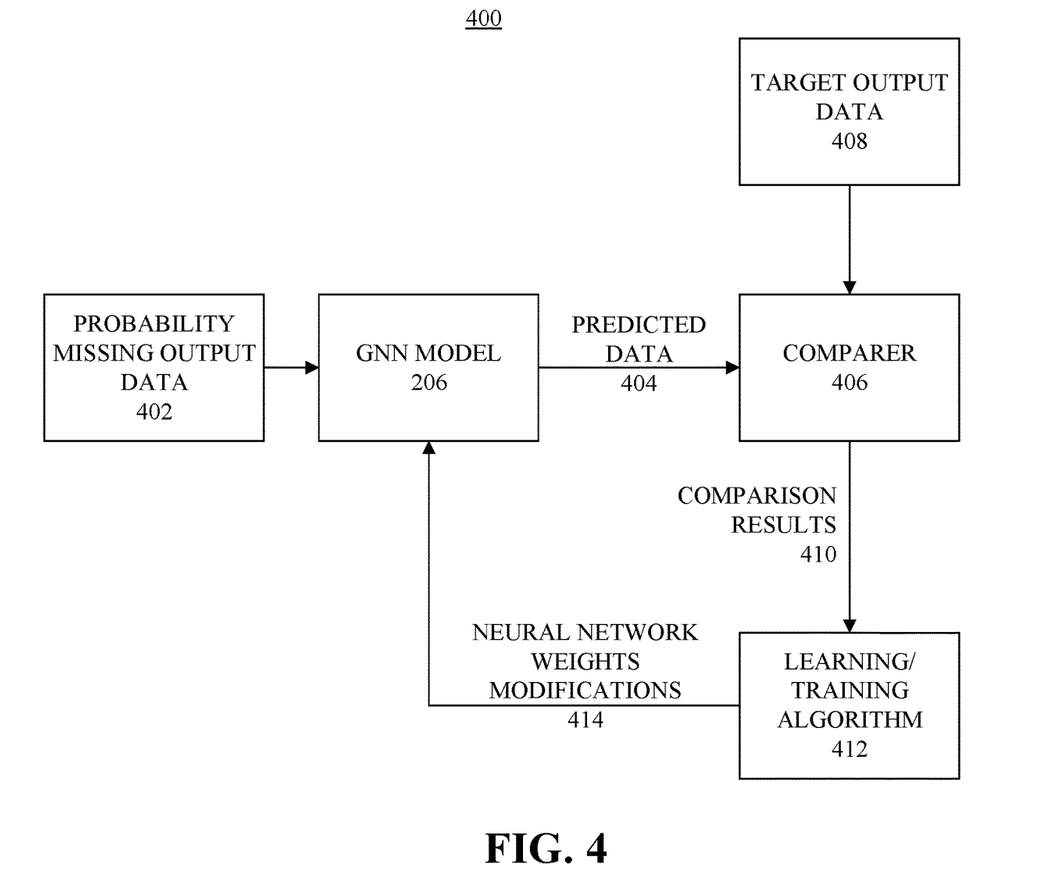
FIG. 4 depicts a process of training a graph neural network model according to an embodiment of the present invention.

Referring to FIG. 3A, at step 302 GNN model trainer 202 can train GNN model 206 to perform entity resolution. In illustration, FIG. 4 depicts an example process of training the GNN model 206. The process can include providing to GNN model 206, as input data, PME output data 402. GNN model 206 can process PME output data 402 to generate predicted data 404. Comparer 406 can compare the predicted data 404 to target output data 408 and, based on the comparison, generate comparison results 410. Learning/training algorithm 412 can process/analyze the comparison results 410 to determine neural network weights modifications 414. Learning/training algorithm 412 can use the neural network weights modifications 414 to modify parameter weightings used in GNN model 206. The process can reiterate until the generated comparison results 410 satisfy specified criteria.

The GNN models used for entity matching explanation, cluster explanation and anomalous node/cluster identification can be trained in a similar manner. For example, entity data can be selected from PME output data along with matching scores of different record pairs. From that data and scores, GNN Model 206 can identify matched records and the pair comparison scores for those matched pairs for each entity. Based on such identification, GNN model 206 can determine features that are important. For instance, matched records that have high pair comparison scores (e.g., higher than a threshold pair comparison score) can be determined to contain attributes for important features. In another example, matched records that have highest pair comparison scores among a group of matched pair records can be determined to contain attributes for import features. In a further example, matched records having attributes that have a high number of matches (e.g., a number of matches greater than a threshold value of matches and/or a number of matches higher than a threshold percentage of other attributes) can be determined to contain attributes for important features.

Referring again to FIG. 3A, at step 304 GNN model 206 can match a plurality of records 224 by performing entity resolution on the plurality of records, and represent each of the plurality of records 224 as a respective node in a graph. In illustration, records 224 can be input into GNN model 206, and GNN model 206 can identify records 224 that pertain to the same entity. GNN model 206 can represent those records 224 that pertain to the same entity as the nodes in the graph. GNN model 206 can add to the graph a node identifier for each node. In one or more arrangements, the node identifiers can be integers sequentially assigned to the nodes as their corresponding records are processed, or the node identifiers can be the identifiers of the respective records represented by the nodes.

Figure 5:
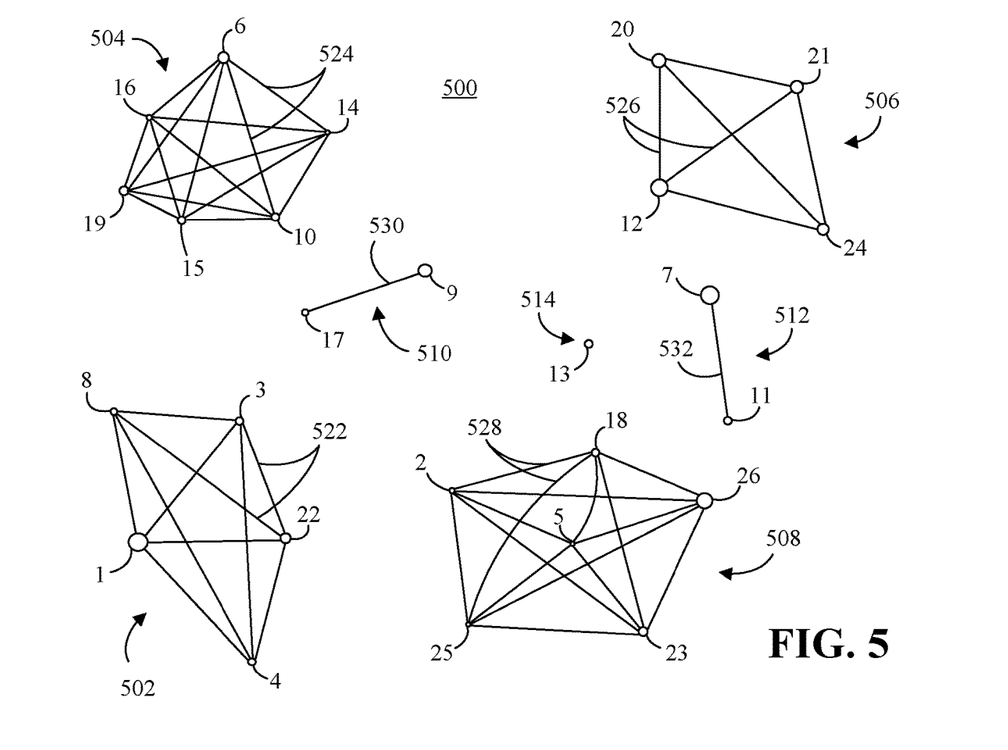
FIG. 5 depicts a graph according to an embodiment of the present invention.

FIG. 5 depicts an example graph 500 according to an embodiment of the present invention. Graph 500 can include nodes 1, 2, 3, 4, 5, 6, 7, 8, 9, 10, 11, 12, 13, 14, 15, 16, 17, 18, 19, 20, 21, 22, 23, 24, 25, 26, each node 1-26 representing a respective record 224 pertaining to the same entity.

Referring again to FIG. 3A, at step 306 GNN model explainer 208 can generate a plurality of record matching explanations, each record matching explanation indicating a first set of attributes, and a first set of values corresponding to the first set of attributes, used for the matching at least two of the plurality of records 224.

Figure 6:
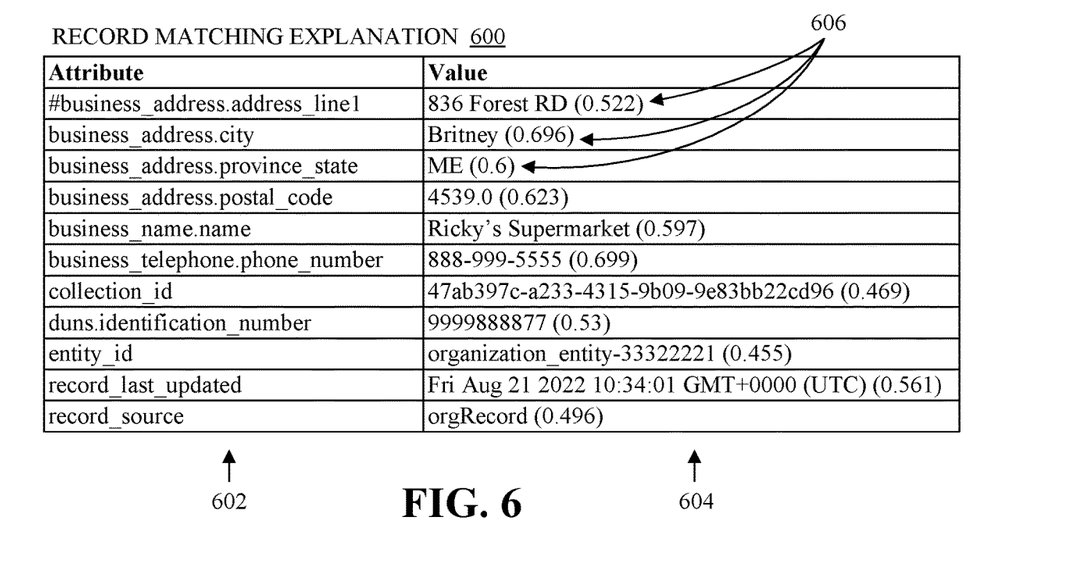
FIG. 6 depicts a matching explanation according to an embodiment of the present invention.

FIG. 6 depicts an example record matching explanation 600. The record matching explanation 600 can include attributes 602 (e.g., fields) contained in the matched records 224 and values 604 contained in a pair of records 224 that match. For each value 604, GNN model explainer 208 can determine a score 606 indicating how significant that value is toward the determination that the pair of records matches. Each score 606 can be a value between 0 and 1, where 0 represents no significance and 1 represents highest possible significance. GNN model explainer 208 can indicate each score 606 next to each value 604 to which the score 606 is assigned. For example, GNN model explainer 208 can indicate each score 606 between parentheses. GNN model explainer 208 can determine each score 606 based on a respective comparison score identified by GNN Model 206, which can be normalized by GNN Model explainer 208 to a value between 0 and 1. Accordingly, features 606 having high scores can be considered to be important features.

Referring again to FIG. 3A, at step 308 clusterer 210 can cluster the nodes 1-26 into a plurality of clusters by aggregating the plurality of record matching explanations and, based on the plurality of record matching explanations, determining which of the plurality of records 224 have high importance values, in the first set of values 604, that match. The nodes for those records that do have high importance values that match can be assigned to the same cluster. The high importance values can be the values 604 having the highest scores 606. Clusterer 210 can determine the clusters based on a single value 604 having the highest score 606, based on two values 604 having the highest two scores 606, based on three values 604 having the highest three scores 606, based on four values 604 having the highest four scores 606, or based on any other suitable number of values 604 having highest scores.

By way of example, referring again to graph 500 of FIG. 5, clusterer 210 can assign nodes 1, 3, 4, 8, 22 to cluster 502, assign nodes 6, 10, 14, 15, 16 and 19 to cluster 504, assign nodes 12, 20, 21, 24 to cluster 506, assign nodes 2, 5, 18, 23, 25, 26 to cluster 508, assign nodes 9, 17 to cluster 510, and assign nodes 7, 11 to cluster 512. In this example, node 13 is assigned to a cluster 514 that only includes node 13.

Clusterer 210 can assign to each node 1-26 a classifier indicating to which cluster the node is assigned. For example, clusterer 210 can assign a sequential integer to each cluster as the clusters are created, and assign that integer to each node 1-26 in the cluster. For example, assume that node 19 is assigned a node identifier "19", and assume cluster 504 is assigned a classifier "2." Node 19 can be indicated in the graph as "19 (4)," wherein "19" is the node identifier and "(4)" is the classifier indicting to which cluster node 19 is assigned.

Clusterer 210 also can create edges 522, 524, 526, 528, 530, 532 between each pair of nodes 1-26 within each respective cluster 502-512. For example, edges 522 can be created between each pair of nodes 1, 3, 4, 8, 22 in cluster 502, edges 524 can be created between each pair of nodes 6, 10, 14, 15, 16 and 19 in cluster 504, edges 526 can be created between each pair of nodes 12, 20, 21, 24 in cluster 506, edges 528 can be created between each pair of nodes 2, 5, 18, 23, 25, 26 in cluster 508, edges 530 can be created between each pair of nodes 9, 17 in cluster 510, and edges 532 can be created between each pair of nodes 7, 11 in cluster 512.

In one or more non-limiting arrangements, clusterer 210 can use a multi-layer perceptron to remove edges 522-532 and features not important for multi-node classification. For example, in each cluster 502-508, clusterer 210 can determine a node 1-26 to be a primary node, and remove all edges 522-528 that do not connect to the primary node. Still, respective edges 522-528 can connect each primary node to every other node in its cluster 502-508, thus still indicating all nodes 1-26 in those clusters 502-508.

Figure 7:
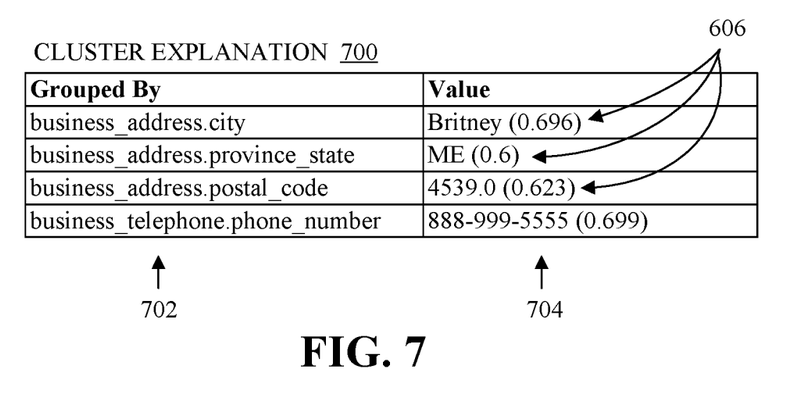
FIG. 7 depicts a cluster explanation according to an embodiment of the present invention.

Referring again to FIG. 3A, at step 310 cluster explainer 212 can generate, for each cluster 502-512, a respective cluster explanation. The cluster explanation can indicate a second set of attributes, and a second set of values corresponding to the second set of attributes, used for the clustering the nodes 1-26. In this regard, the second set of values can be a subset of the first set of values, and include the values having the highest scores 606. The second set of attributes can be the attributes corresponding to those values. FIG. 7 depicts an example cluster explanation 700, which includes the second set of attributes 702 and the second set of values 704, as well as the scores 606 assigned to those values 704.

Figure 8:
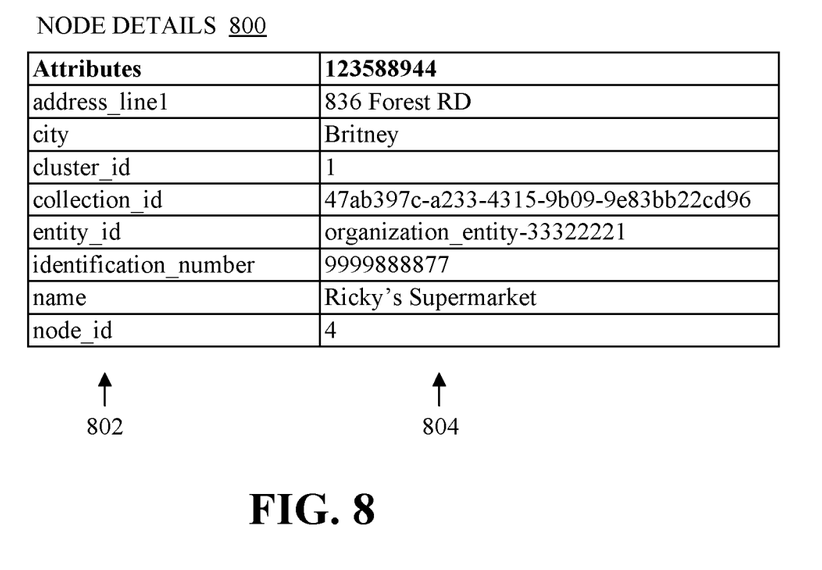
FIG. 8 depicts an explanation of details of a node according to an embodiment of the present invention.

Cluster explainer 212 also can, for each node 1-26, generate node details. FIG. 8 depicts an example of node details 800. The node details 800 for each node can include the attributes 802 for the record 224 represented by the node 1-26, and the respective values 804 assigned to those attributes 802.

Referring again to FIG. 3A, at step 312, cluster explainer 212 can assign a respective score to each node of the graph based on analyzing the record represented by the node. Each of such scores can be a self score which cluster explainer 212 can determine by comparing each record, represented by the node, with itself. For example, every attribute can be compared individually with itself and then weighted by its importance value. After comparing a record with itself, a score can be generated. The score can be a total score resulting from summing a plurality of individual scores. In this regard, different attributes can have different scoring schemes. For example, a score can be assigned to a name attribute, a score can be assigned to an address attribute, and so on. The total score can represent a strength of information contained in the record to which the total score is assigned. The higher the total score, the higher is the level of confidence that data in the record is accurate. The lower the total score, the lower is the level of confidence that data in the record is accurate.

At step 314 cluster explainer 212 can determine a representative record for the entity based on the scores assigned to the nodes 1-26. For example, a record corresponding to the node 1-26 having the highest score can be identified as the representative record. The representative record can be a record represented by a node that is a center member of a cluster. The representative record can provide a way to simply represent an entity rather than representing the entity by all records in the cluster.

Referring to FIG. 3B, at step 316 inter-cluster edge explainer 216 can generate an inter-cluster edge explanation. The inter-cluster edge explanation can indicate at least one dissimilarity between at least two nodes in different clusters. The inter-cluster edge explanation can explain why a pair of clusters is different and not combined. For purposes of clarity, FIG. 5 does not edges between nodes of different clusters, but GNN model 206 can determine such edges.

Figure 9:
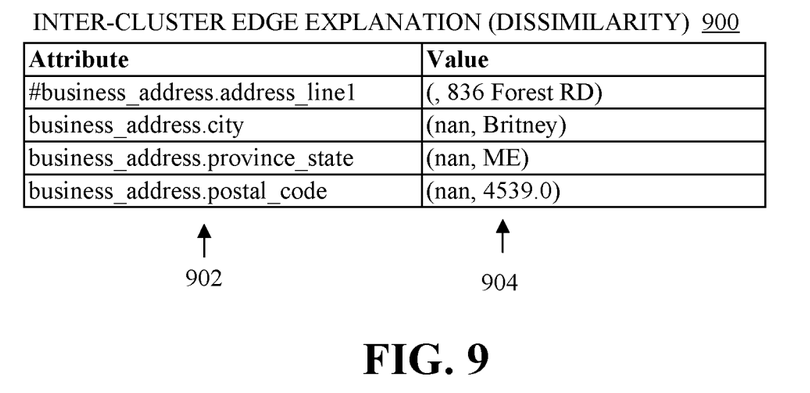
FIG. 9 depicts an inter-cluster edge explanation according to an embodiment of the present invention.

FIG. 9 depicts an example of an inter-cluster edge explanation 900. The inter-cluster edge explanation 900 can indicate the attributes 902 for the records having values that do not match, and the values 904 for both records. The values 904 for the different records can be separated by commas, for example.

Figure 10:
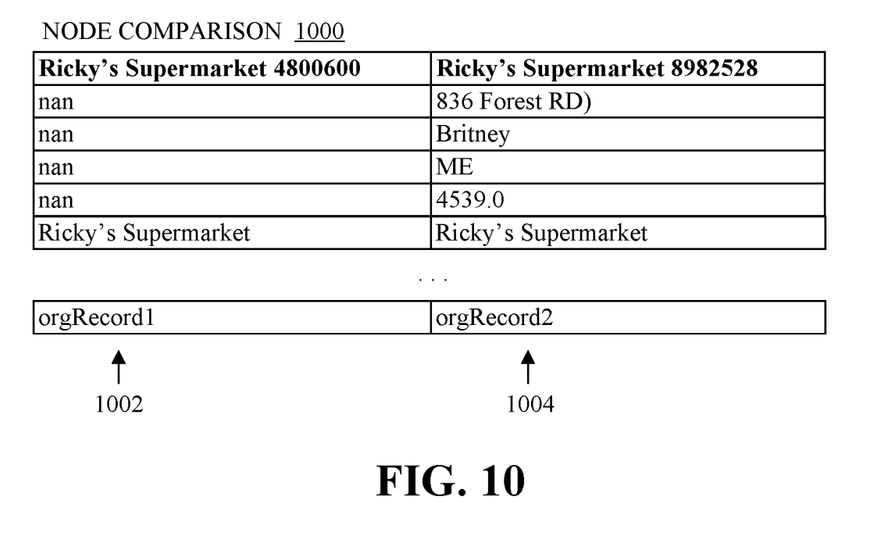
FIG. 10 depicts a node comparison according to an embodiment of the present invention.

Inter-cluster edge explainer 216 also can generate a node comparison that presents a comparison of values of a pair of nodes. FIG. 10 depicts an example of a node comparison 1000, which can include values 1002 from a first record represented by a first node, and values 1004 from a second record represented by a second node. Values in a same row in the node comparison 1000 pertain to the same attribute.

Referring to FIG. 3B, at step 318 anomalous node/cluster identifier 218 can identify nodes and/or clusters that are anomalous. An anomalous node is a node representing a record that is associated with (e.g., assigned to) an entity when that record should not be associated with the entity. An anomalous cluster is a cluster than includes one or more anomalous nodes. As noted, anomalous node/cluster identifier 218 can implement an Isolation Forest algorithm on a vector of the entire record's values, or a vector of a subset of the entire record's values, using a GNN model trained to identify nodes and/or clusters that are anomalous. A subset of record values in the vector can be values of the fields of the record corresponding to the fields used to cluster other records. Since the record is treated as a single vector, issues that otherwise would arise using a typical Isolation Forest implementation on individual values in a record that is sparsely populated with data (e.g., one or more null values) can be avoided. An example of such an issue is an overfitting issue, which can arise if all attributes are considered separately. In this regard, merely using Isolation Forest without the inventive arrangements described herein could result in most records, if not all records, being indicated as anomalous.

Anomalous nodes and clusters are those nodes and clusters whose record values have little to no correlation with other nodes and clusters. In illustration, referring to FIG. 5, the node 13 is not assigned to a cluster, and the clusters 510, 512 only include a small quantity of nodes, nodes 9, 17 and nodes 7, 11, respectively. Accordingly, anomalous node/cluster identifier 218 can identify nodes 7, 9, 11, 13, 17 as anomalous nodes and identify clusters 510, 512 as anomalous clusters.

At step 320, user interface 220 can output the graph, record matching explanations, cluster explanations, node details, representative records, inter-cluster edge explanations, node comparisons, and data indicating the anomalous nodes and/or clusters. For example, user interface 220 can store such data and make the data readily accessible to a user via one or more menu items.

At step 322 user interface 220 can receive a user input indicating at least one anomalous node and/or anomalous cluster to unlink from the graph. Responsive to that user input, at step 324 unlink analyzer 222 can determine an impact on the graph of unlinking the indicated anomalous nodes and/or anomalous clusters from the graph by analyzing the graph without the indicated anomalous nodes and/or anomalous clusters. At step 326 user interface 220 can output the determined impact on the graph of unlinking the indicated anomalous nodes and/or anomalous clusters from the graph.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   matching a plurality of records by a graph neural network model performing entity resolution on the plurality of records, and representing each of the plurality of records as a respective node in a graph;
   generating a plurality of record matching explanations, each record matching explanation indicating a first set of attributes, and a first set of values corresponding to the first set of attributes, used for the matching at least two of the plurality of records;
   clustering the nodes into a plurality of clusters by aggregating the plurality of record matching explanations and, based on the plurality of record matching explanations, determining which of the plurality of records have high importance values, in the first set of values, that match;
   generating, using a processor, at least one cluster explanation, the cluster explanation indicating a second set of attributes, and a second set of values corresponding to the second set of attributes, used for the clustering the nodes;
   outputting the record matching explanation and the cluster explanation; and
   training the graph neural network model to perform the entity resolution, the training comprising using probabilistic matching engine output data as input data to the graph neural network.

2. The method of claim 1, further comprising:
   identifying at least one anomalous node or cluster in the graph;
   outputting data indicating the at least one anomalous node or cluster in the graph;
   receiving a user input indicating the at least one anomalous node or cluster to unlink from the graph;
   responsive to the receiving the user input indicating the at least one anomalous node or cluster to unlink from the graph, determining an impact on the graph of unlinking the at least one anomalous node or cluster from the graph by analyzing the graph without the indicated anomalous nodes and/or anomalous clusters to unlink from the graph; and
   outputting the determined impact on the graph of unlinking the indicated anomalous nodes and/or anomalous clusters from the graph.

3. The method of claim 1, wherein:
   the generating the plurality of record matching explanations comprises assigning, to each value in the first set of values, a score indicating how significant the value is toward a determination that a pair of records match; and
   the determining which of the plurality of records have high importance values comprises determining values in the first set of values having highest scores.

4. The method of claim 3, wherein the cluster explanation indicates, for each value in the second set of values, the score indicating how significant the value is toward the determination that the pair of records match.

5. The method of claim 1, further comprising:
   assigning a respective score to each node of the graph based on analyzing the record represented by the node; and
   determining a representative record for the entity based on the scores assigned to the nodes.

6. The method of claim 1, further comprising:
   generating an inter-cluster edge explanation, the inter-cluster edge explanation indicating at least one dissimilarity between at least two nodes.

7. A system, comprising:
   a processor programmed to initiate executable operations comprising:
   matching a plurality of records by a graph neural network model performing entity resolution on the plurality of records, and representing each of the plurality of records as a respective node in a graph;
   generating a plurality of record matching explanations, each record matching explanation indicating a first set of attributes, and a first set of values corresponding to the first set of attributes, used for the matching at least two of the plurality of records;
   clustering the nodes into a plurality of clusters by aggregating the plurality of record matching explanations and, based on the plurality of record matching explanations, determining which of the plurality of records have high importance values, in the first set of values, that match;
   generating at least one cluster explanation, the cluster explanation indicating a second set of attributes, and a second set of values corresponding to the second set of attributes, used for the clustering the nodes;
   outputting the record matching explanation and the cluster explanation; and
   training the graph neural network model to perform the entity resolution, the training comprising using probabilistic matching engine output data as input data to the graph neural network.

8. The system of claim 7, the executable operations further comprising:
   identifying at least one anomalous node or cluster in the graph;
   outputting data indicating the at least one anomalous node or cluster in the graph;
   receiving a user input indicating the at least one anomalous node or cluster to unlink from the graph;
   responsive to the receiving the user input indicating the at least one anomalous node or cluster to unlink from the graph, determining an impact on the graph of unlinking the at least one anomalous node or cluster from the graph by analyzing the graph without the indicated anomalous nodes and/or anomalous clusters to unlink from the graph; and outputting the determined impact on the graph of unlinking the indicated anomalous nodes and/or anomalous clusters from the graph.

9. The system of claim 7, wherein:

the generating the plurality of record matching explanations comprises assigning, to each value in the first set of values, a score indicating how significant the value is toward a determination that a pair of records match; and the determining which of the plurality of records have high importance values comprises determining values in the first set of values having highest scores.

10. The system of claim 9, wherein the cluster explanation indicates, for each value in the second set of values, the score indicating how significant the value is toward the determination that the pair of records match.

11. The system of claim 7, the executable operations further comprising:

assigning a respective score to each node of the graph based on analyzing the record represented by the node; and determining a representative record for the entity based on the scores assigned to the nodes.

12. The system of claim 7, the executable operations further comprising:

generating an inter-cluster edge explanation, the inter-cluster edge explanation indicating at least one dissimilarity between at least two nodes.

13. A computer program product, comprising:

one or more computer readable storage mediums having program code stored thereon, the program code stored on the one or more computer readable storage mediums collectively executable by a data processing system to initiate operations including:

matching a plurality of records by a graph neural network model performing entity resolution on the plurality of records, and representing each of the plurality of records as a respective node in a graph;

generating a plurality of record matching explanations, each record matching explanation indicating a first set of attributes, and a first set of values corresponding to the first set of attributes, used for the matching at least two of the plurality of records;

clustering the nodes into a plurality of clusters by aggregating the plurality of record matching explanations and, based on the plurality of record matching explanations, determining which of the plurality of records have high importance values, in the first set of values, that match;

generating at least one cluster explanation, the cluster explanation indicating a second set of attributes, and a second set of values corresponding to the second set of attributes, used for the clustering the nodes;

outputting the record matching explanation and the cluster explanation; and training the graph neural network model to perform the entity resolution, the training comprising using probabilistic matching engine output data as input data to the graph neural network.

14. The computer program product of claim 13, wherein the program code is executable by the data processing system to initiate operations further comprising:

identifying at least one anomalous node or cluster in the graph;

outputting data indicating the at least one anomalous node or cluster in the graph;

receiving a user input indicating the at least one anomalous node or cluster to unlink from the graph;

responsive to the receiving the user input indicating the at least one anomalous node or cluster to unlink from the graph, determining an impact on the graph of unlinking the at least one anomalous node or cluster from the graph by analyzing the graph without the indicated anomalous nodes and/or anomalous clusters to unlink from the graph; and outputting the determined impact on the graph of unlinking the indicated anomalous nodes and/or anomalous clusters from the graph.

15. The computer program product of claim 13, wherein:

the generating the plurality of record matching explanations comprises assigning, to each value in the first set of values, a score indicating how significant the value is toward a determination that a pair of records match; and the determining which of the plurality of records have high importance values comprises determining values in the first set of values having highest scores.

16. The computer program product of claim 15, wherein the cluster explanation indicates, for each value in the second set of values, the score indicating how significant the value is toward the determination that the pair of records match.

17. The computer program product of claim 13, wherein the program code is executable by the data processing system to initiate operations further comprising:

assigning a respective score to each node of the graph based on analyzing the record represented by the node; and determining a representative record for the entity based on the scores assigned to the nodes.

* * * * *